(12) United States Patent
Oohashi

(10) Patent No.: US 8,212,441 B2
(45) Date of Patent: Jul. 3, 2012

(54) AUTOMOTIVE ALTERNATOR

(75) Inventor: Atsushi Oohashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 308 days.

(21) Appl. No.: 12/595,153

(22) PCT Filed: May 22, 2007

(86) PCT No.: PCT/JP2007/060419
§ 371 (c)(1),
(2), (4) Date: Oct. 8, 2009

(87) PCT Pub. No.: WO2008/142778
PCT Pub. Date: Nov. 27, 2008

(65) Prior Publication Data
US 2011/0187243 A1 Aug. 4, 2011

(51) Int. Cl.
*H02K 9/06* (2006.01)
(52) U.S. Cl. .................. 310/68 D; 310/68 C; 310/68 R; 310/239; 310/58
(58) Field of Classification Search ............... 310/68 D, 310/68 R, 68 C, 239, 58–59, 61
See application file for complete search history.

(56) References Cited

U.S. PATENT DOCUMENTS

| | | | | |
|---|---|---|---|---|
| 5,686,780 A | * | 11/1997 | Adachi et al. | 310/68 D |
| 6,291,913 B1 | | 9/2001 | Nikawa et al. | |
| 6,735,071 B2 | * | 5/2004 | Oohashi et al. | 361/306.1 |
| 7,741,739 B2 | * | 6/2010 | Ito | 310/58 |
| 2001/0030472 A1 | | 10/2001 | Ihata | |

FOREIGN PATENT DOCUMENTS

| | | |
|---|---|---|
| CN | 1245361 A | 2/2000 |
| JP | 64-085566 A | 3/1989 |
| JP | 08-251889 A | 9/1996 |
| JP | 3579298 B2 | 1/2001 |
| JP | 2001-298907 A | 10/2001 |
| JP | 2002-142423 A | 5/2002 |

OTHER PUBLICATIONS

Korean Office Action corresponding to Korean Patent Application No. 10-2009-7018857 dated Feb. 21, 2011.

* cited by examiner

*Primary Examiner* — Quyen Leung
*Assistant Examiner* — Leda Pham
(74) *Attorney, Agent, or Firm* — Sughrue Mion, PLLC

(57) ABSTRACT

An automotive alternator is provided that has a brush holder assembly that reduces exclusive circumferential space for the brush holder assembly inside a rear bracket, and that also reduces entry of water, dust, etc., into a regulator circuit housing portion.

The brush holder assembly has a base and a plate. The base is prepared by molding a brush holder portion, a regulator circuit housing portion, and a connector portion integrally, and the plate is mounted to the brush holder portion, and has a cover portion that closes the resin injection aperture of the regulator circuit housing portion. The brush holder portion, the regulator circuit housing portion, and the connector portion are formed so as to be positioned such that respective center lines thereof are in a common plane that includes a central axis of the rotating shaft. A lead-through opening that is formed on the rear bracket so as to allow the connector portion to be led through is generally closed by the connector portion and the cover portion.

9 Claims, 10 Drawing Sheets

Insertion diagram

After insertion

BKT
Opening portion
Large

AUTOMOTIVE ALTERNATOR

TECHNICAL FIELD

The present invention relates to an automotive alternator, and particularly relates to improvement of a brush holder assembly in which a regulator circuit housing portion, a connector portion, and a brush holder portion are configured integrally.

BACKGROUND ART

In conventional automotive alternators, a brush holder assembly has been constructed integrally such that a connector portion is disposed on one side of a regulator circuit housing portion and a brush portion (see Patent Literature 1, for example).
Patent Literature 1: Japanese Patent No. 3579298 (Gazette)

DISCLOSURE OF THE INVENTION

Problem to be Solved by the Invention

In conventional automotive alternators, the connector portion is positioned on one side of the regulator circuit housing portion and the brush holder portion. Thus, when the brush holder assembly is disposed inside a bracket so as to be perpendicular to a central axis of a rotating shaft, the brush holder assembly extends over a wide area in a circumferential direction. Consequently, installation space is reduced for a rectifier that is disposed inside the bracket on a plane identical to that of the brush holder assembly.

A resin injection aperture of the regulator circuit housing portion also opened radially outward, facilitating entry of water, dust, etc., into the regulator circuit housing portion through a connector portion lead-through opening that is formed on the bracket.

The present invention aims to solve the above problems and an object of the present invention is to provide an automotive alternator that has a brush holder assembly that reduces exclusive circumferential space for the brush holder assembly in a rear bracket, and that also enables entry of water, dust, etc., into a regulator circuit housing portion to be reduced.

Means for Solving the Problem

In order to achieve the above object, according to one aspect of the present invention, there is provided an automotive alternator including: a rotor that is fixed to a rotating shaft; a front bracket and a rear bracket that rotatably support the rotating shaft and that envelop the rotor; a stator that is held by the front bracket and the rear bracket and that surrounds the rotor; a cooling fan that is fixed to an axial end surface of the rotor; and a regulator circuit that adjusts magnitude of alternating-current voltage that is generated by the stator. The automotive alternator also includes: a base into which are molded integrally: a brush holder portion that is disposed so as to face the rotor such that an aperture direction of a brush insertion aperture is aligned in a radial direction, and that holds a brush inside the brush insertion aperture; a regulator circuit housing portion that is disposed such that a resin injection aperture faces radially outward at a rear bracket end of the brush holder portion, and that houses and holds the regulator circuit; and a connector portion that is disposed at the rear bracket end of the brush holder portion, the base being mounted inside the rear bracket; a cap that is mounted onto a radially outer end portion of the brush holder portion, and that closes the brush insertion aperture; and a resin plate that is mounted onto the brush holder portion, and that has a cover portion that closes the resin injection aperture. The brush holder portion, the regulator circuit housing portion, and the connector portion are formed so as to be positioned such that respective center lines thereof are in a common plane that includes a central axis of the rotating shaft, and a lead-through opening that is formed on the rear bracket so as to allow the connector portion to be led through is generally closed by the connector portion and the cover portion.

Effects of the Invention

According to the present invention, because the brush holder portion, the regulator circuit housing portion, and the connector portion are formed so as to be positioned such that respective center lines thereof are in a common plane that includes a central axis of the rotating shaft, exclusive circumferential space for the base can be reduced. Because the lead-through opening that is formed on the rear bracket so as to allow the connector portion to be led through is generally closed by the connector portion and the cover portion, entry of water, dust, etc., through the lead-through opening into the rear bracket can be suppressed.

BEST MODE FOR CARRYING OUT THE INVENTION

Figure 1:
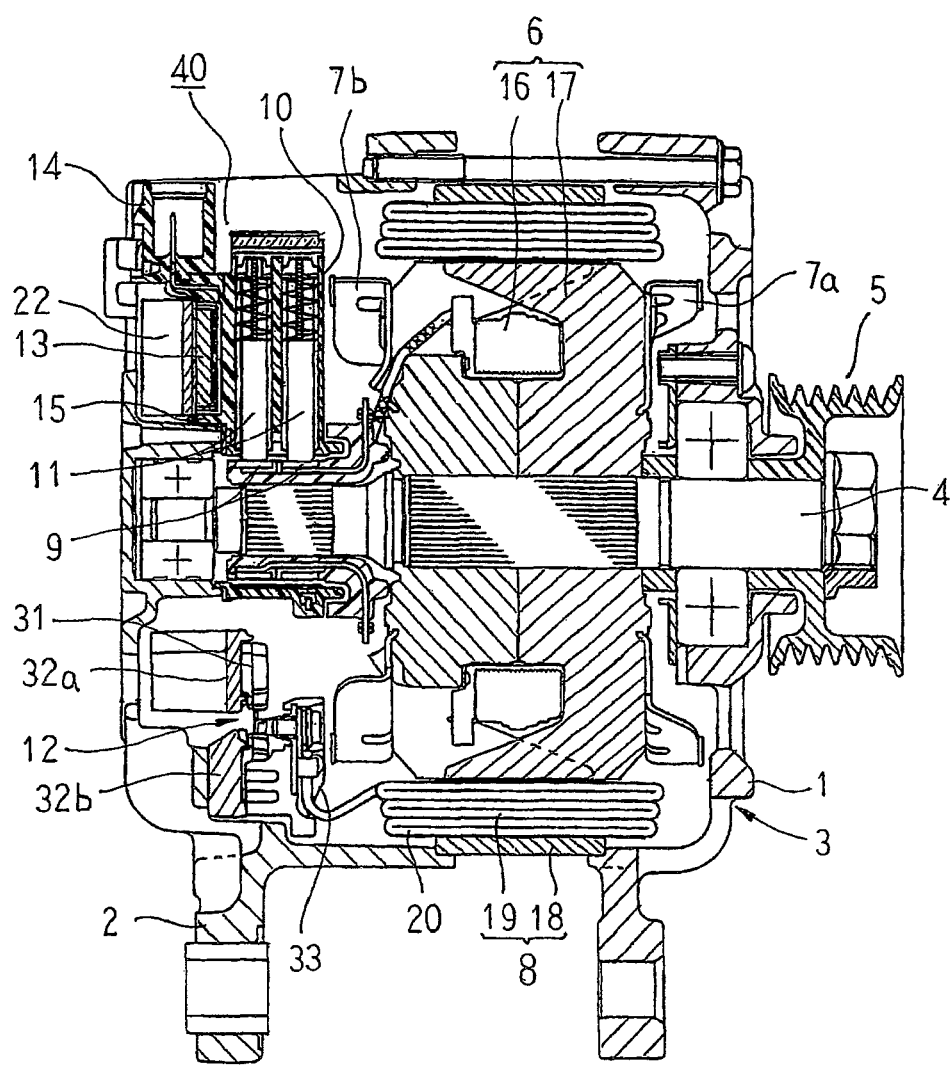
FIG. 1 is a cross section that shows an overall configuration of an automotive alternator according to a preferred embodiment of the present invention.

FIG. 1 is a cross section that shows an overall configuration of an automotive alternator according to a preferred embodiment of the present invention.

In FIG. 1, an automotive alternator includes: a case 3 that is constituted by a front bracket 1 and a rear bracket 2 that are each approximately bowl-shaped and made of aluminum; a rotating shaft 4 that is rotatably supported at a central axial position of the case 3; a pulley 5 that is fixed to a first end of the rotating shaft 4 that projects outward at a front end of the case 3; a claw-pole rotor 6 that is fixed to the rotating shaft 4 so as to be rotatably disposed inside the case 3; a stator 8 that is held by an inner wall surface of the case 3 so as to surround the rotor 6; a pair of slip rings 9 that are fixed to a second end portion of the rotating shaft 4 so as to supply electric current to a rotor coil 16 of the rotor 6; a brush holder portion 10 that is disposed radially outside the slip rings 9; brushes 11 that are disposed inside the brush holder portion 10 so as to slide in contact with the respective slip rings 9; a rectifier 12 that is electrically connected to a stator coil 19 of the stator 8 so as to rectify alternating current that is generated in the stator coil 19 into direct current; a regulator circuit 13 that adjusts magnitude of alternating voltage that is generated in the stator coil 19; and a connector portion 14 to which an external connector can be mounted.

The rotor 6 has: a rotor coil 16 that generates magnetic flux on passage of electric current; and a pole core 17 that is disposed so as to cover the rotor coil 16 and in which magnetic poles are formed by the magnetic flux. The rotating shaft 4 is inserted through a central axial position of the pole core 17 and fixed. Cooling fans 7a and 7b are fixed to two axial end surfaces of the pole core 17.

The stator 8 includes: a stator core 18 that is held between the front bracket 1 and the rear bracket 2 and that is disposed so as to surround the rotor 6; and a stator coil 19 that is mounted to the stator core 18. The stator coil 19 is prepared by installing conductor wires in slots of the stator core 18. The conductor wires extend outward from the slots of the stator core 18 at two axial ends of the stator core 18 to constitute coil ends 20. Portions of the conductor wires that are housed inside the slots of the stator core 18 are formed so as to have rectangular cross sections. Here, a rotating magnetic field is applied to the stator coil 19 by rotation of the rotor 6, generating electromotive force in the stator coil 19.

Figure 2:
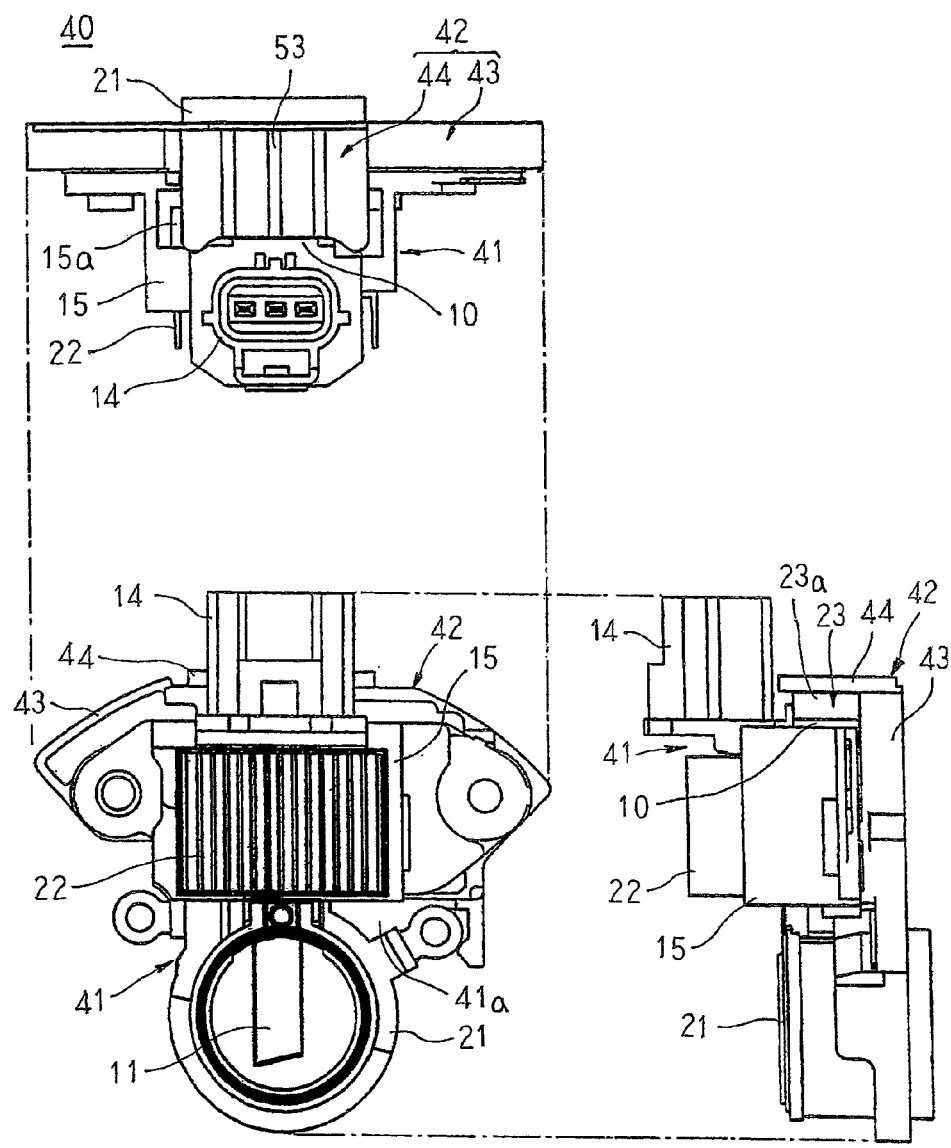
FIG. 2 is a front elevation, a top plan and a right side elevation of a brush holder assembly that can be used in the automotive alternator according to the preferred embodiment of the present invention.
Figure 3:
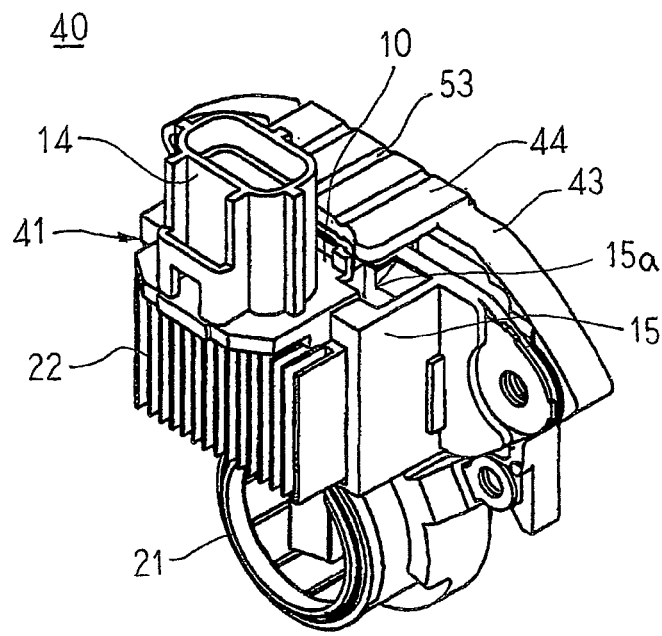
FIG. 3 is a perspective of the brush holder assembly that can be used in the automotive alternator according to the preferred embodiment of the present invention.
Figure 4:
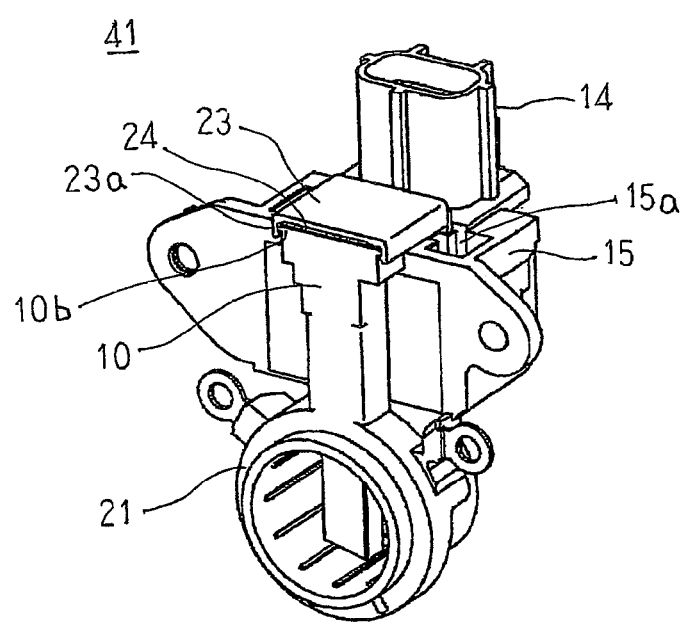
FIG. 4 is a perspective of a base that constitutes the brush holder assembly that can be used in the automotive alternator according to the preferred embodiment of the present invention.
Figure 5:
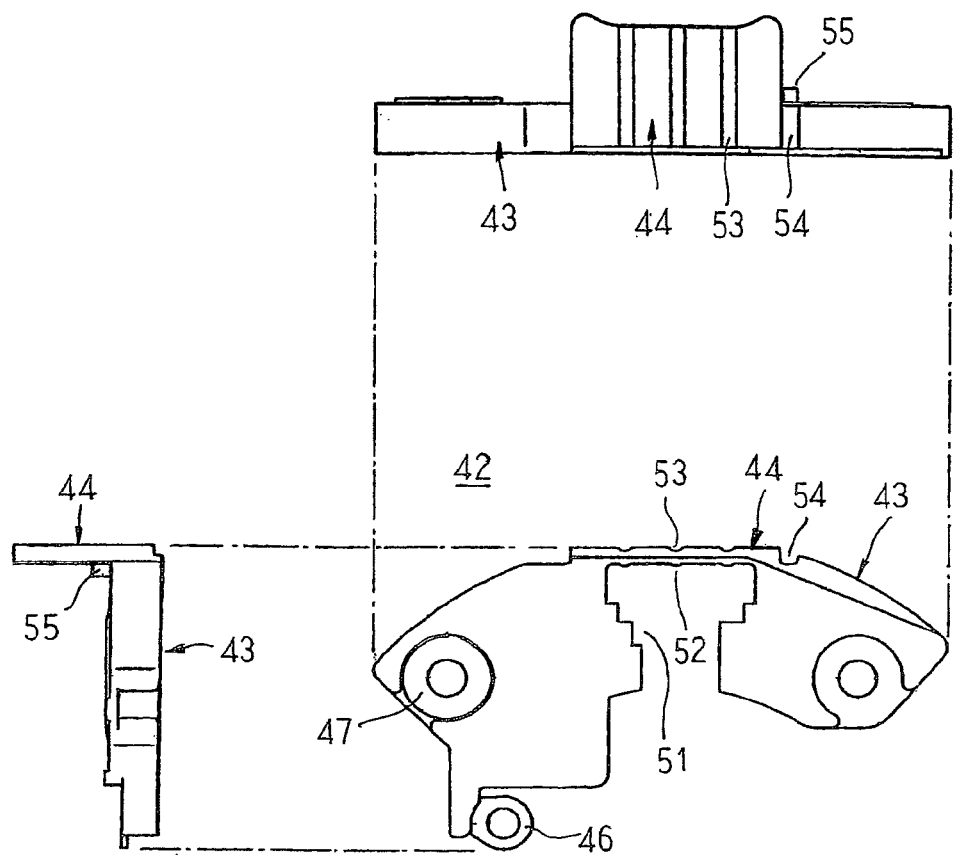
FIG. 5 is a front elevation, a top plan and a left side elevation of a plate that constitutes the brush holder assembly that can be used in the automotive alternator according to the preferred embodiment of the present invention.
Figure 6:
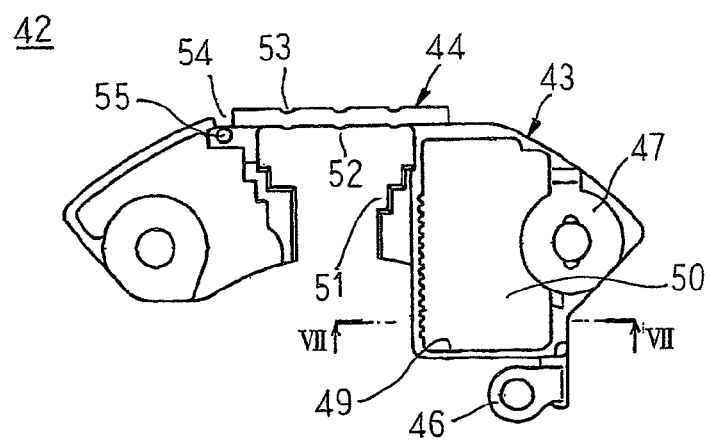
FIG. 6 is a rear elevation of the plate that constitutes the brush holder assembly that can be used in the automotive alternator according to the preferred embodiment of the present invention.
Figure 7:
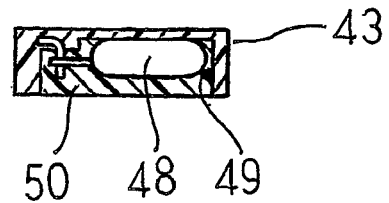
FIG. 7 is a cross section that is taken along line VII-VII in FIG. 6 so as to be viewed in the direction of the arrows.
Figure 8:
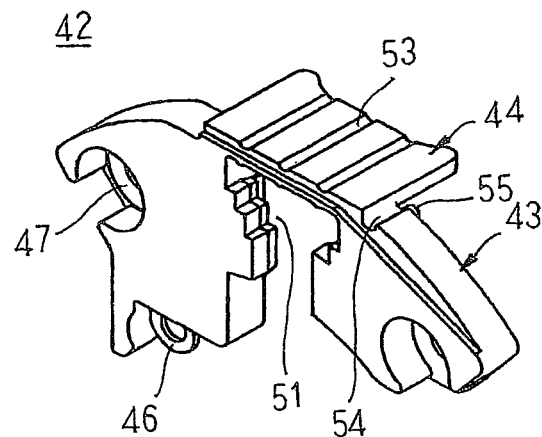
FIG. 8 is a perspective of the plate that constitutes the brush holder assembly that can be used in the automotive alternator according to the preferred embodiment of the present invention.
Figure 9:
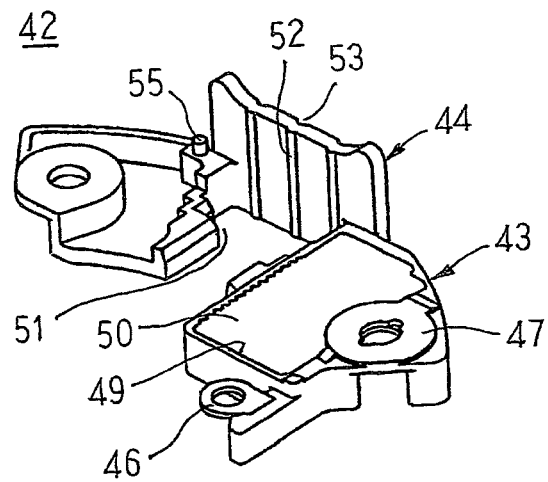
FIG. 9 is a perspective of the plate that constitutes the brush holder assembly that can be used in the automotive alternator according to the preferred embodiment of the present invention.

Next, configuration of a brush holder assembly 40 will be explained with reference to FIGS. 2 through 9. FIG. 2 is a front elevation, a top plan and a right side elevation of a brush holder assembly that can be used in the automotive alternator according to the preferred embodiment of the present invention, FIG. 3 is a perspective of the brush holder assembly; and FIG. 4 is a perspective of a base that constitutes the brush holder assembly. FIG. 5 is a front elevation, a top plan and a left side elevation of a plate that constitutes the brush holder assembly, FIG. 6 is a rear elevation of the plate that constitutes the brush holder assembly, and FIG. 7 is a cross section that is taken along line VII-VII in FIG. 6 so as to be viewed in the direction of the arrows. FIGS. 8 and 9 are perspectives of the plate that constitutes the brush holder assembly, FIG. 8 showing a front surface side of the plate and FIG. 9 showing a rear surface side of the plate.

The brush holder assembly 40 includes: a base 41 into which the brush holder portion 10, the connector portion 14, a regulator circuit housing portion 15, and a hollow cylindrical slinger portion 21 are molded integrally using a polyphenylene sulfide (PPS) resin, for example; and a plate 42 that can be removably mounted onto the brush holder portion 10. Here, because a central axis of the slinger portion 21 is aligned with a central axis of the rotating shaft 4, a direction that is perpendicular to the central axis of the slinger portion 21 will be called a radial direction.

The brush holder portion 10 is disposed so as to extend radially from an outer circumferential surface of the slinger portion 21. Brush insertion apertures 10a are formed on the brush holder portion 10 so as to be separated in an axial direction of the slinger portion 21 and so as to face inside the slinger portion 21. The regulator circuit housing portion 15 is disposed so as to overlap with and be adjacent to the brush holder portion 10 at a first end of the brush holder portion 10 in the axial direction of the slinger portion 21. The connector portion 14 is disposed so as to be adjacent to the regulator circuit housing portion 15 radially outside the regulator circuit housing portion 15 such that an opening portion 14a faces radially outward. Respective center lines of the brush holder portion 10, the connector portion 14, and the regulator circuit housing portion 15 are positioned in a common plane that passes through the central axis of the slinger portion 21, i.e., the central axis of the rotating shaft 4. Ventilating apertures 41a are disposed through the base 41 on a first circumferential side of the brush holder portion 10.

The regulator circuit 13 is fixed to a heatsink 22 that has a plurality of fins using adhesive, etc., and is housed and held inside the regulator circuit housing portion 15 from an opening of the regulator circuit housing portion 15 at a first axial end of the slinger portion 21. An insulating resin is injected through a resin injection aperture 15a that is open on a radially outer side of the regulator circuit housing portion 15 so as to fill the regulator circuit housing portion 15. The brushes 11 are inserted into the respective brush insertion apertures 10a of the brush holder portion 10, and are pressed toward the slinger portion 21 by forces from springs 25.

Caps that close the brush insertion apertures 10a are configured so as to have a two-layer construction that is constituted by a resin cap 23 and a rubber cap 24. The resin cap 23 is mounted by fitting two end recess portions 23a thereof from a radially upper end portion of the brush holder portion 10 onto flange portions 10b that are disposed so as to protrude from two circumferential sides. The rubber cap 24 is fixed to an inner surface of the resin cap 23 and closes the respective brush insertion apertures 10a.

The plate 42 is molded using a PPS resin, for example, and has: a straightening vane portion 43 that has a front surface that is a flat surface; and a cover portion 44 that is disposed so as to extend at a right angle from the straightening vane portion 43 and that approximately covers the resin injection aperture 15a of the regulator circuit housing portion 15.

First ends of insert conductors that are insert molded into the plate 42 are exposed from the straightening vane portion 43 so as to form terminal portions 46 and 47, and second ends project into a capacitor housing portion 49 that is recessed into a rear surface of the straightening vane portion 43. A noise-preventing capacitor 48 is connected to the end portions of the insert conductors that project into the capacitor housing portion 49, and is housed inside the capacitor housing portion 49. A filler resin 50 is injected into the capacitor housing portion 49 so as to embed the capacitor 48.

An interfitting portion 51 that fits together with the brush holder portion 10 is formed so as to have a partially stepped internal shape that conforms to an external shape of the radially upper end portion of the brush holder portion 10 in a vicinity of a root base portion of the cover portion 44 of the straightening vane portion 43. Three lugs 52 that extend in a direction of projection of the cover portion 44 are disposed on an inner circumferential surface of the cover portion 44 at a predetermined spacing in a direction that is perpendicular to the direction of projection of the cover portion 44. The plate 42 is mounted to the base 41 by fitting the interfitting portion 51 over the brush holder portion 10. The lugs 52 thereby press an upper end surface of the resin cap 23 so as to prevent the resin cap 23 from dislodging. The brush holder portion 10 and the straightening vane portion 43 are positioned approximately in a common plane so as to constitute a generally flat surface.

Three recessed grooves 53 that extend in the direction of projection of the cover portion 44 are disposed on an outer circumferential surface of the cover portion 44 at positions that correspond to the lugs 52 so as to have groove shapes that fit together with the lugs 52. A groove 54 is formed on a side wall of the straightening vane portion 43 at one circumferential end of the cover portion 44 so as to have a groove direction that is parallel to a groove direction of the recessed grooves 53. An interfitting pin 55 is disposed so as to stand on a rear surface edge portion of the straightening vane portion 43 in close proximity to the groove 54. In other words, the lugs 52 and the recessed grooves 53 constitute interfitting engaging portions that can be stacked, and the groove 54 and the pin 55 also constitute interfitting engaging portions that can be stacked. Thus, compact stacking can be achieved when two plates 42 are stacked together such that the recessed grooves 53 of the cover portion 44 of one are fitted together with the lugs 52 of the cover portion 44 of the other by fitting together a groove 54 of one with a pin 55 of the other.

Figure 10A:
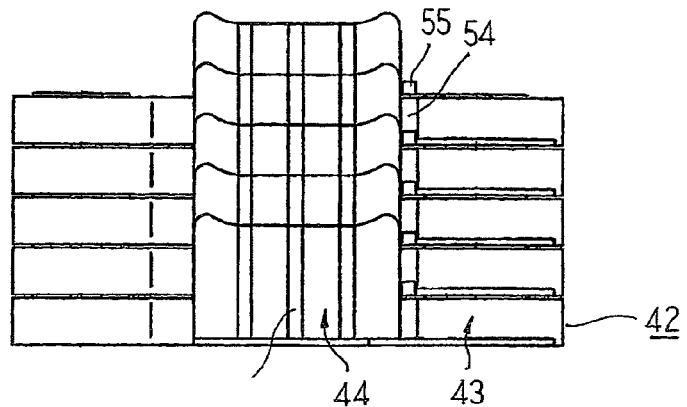
FIG. 10A is a top plan that shows a stacked state of plates that can be used in the automotive alternator according to the preferred embodiment of the present invention.
Figure 10B:
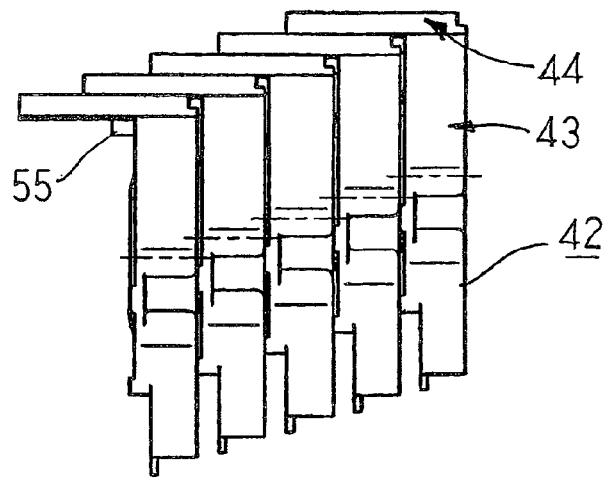
FIG. 10B is a side elevation that shows the stacked state of the plates that can be used in the automotive alternator according to the preferred embodiment of the present invention.
Figure 10C:
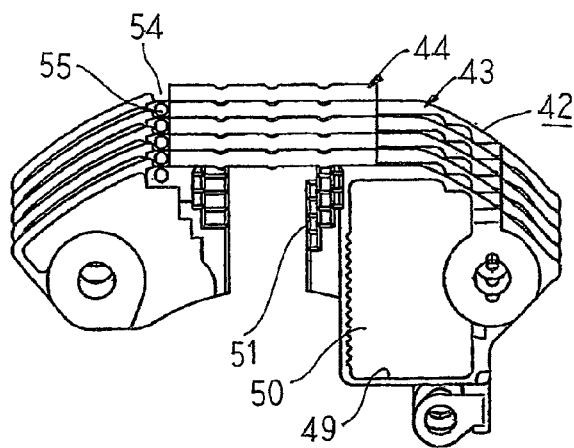
FIG. 10C is a rear elevation that shows the stacked state of the plates that can be used in the automotive alternator according to the preferred embodiment of the present invention.

Thus, the plates 42 can be conveyed in a compact state in stacks of five, for example. Here, the five plates 42 are stacked together so as to be offset by a thickness of the cover portion 44 such that front and rear surfaces of the straightening vane portions 43 of adjacent plates 42 contact each other and front and rear surfaces of the cover portion 44 contact each other, as shown in FIGS. 10A through 10C. The recessed grooves 53 fit together with the lugs 52 of the adjacent plate 42, and the pin 55 fits together with the groove 54, preventing misalignments between the plates 42.

Next, a mounted state of a rectifier and a brush holder assembly will be explained.

Figure 11A:
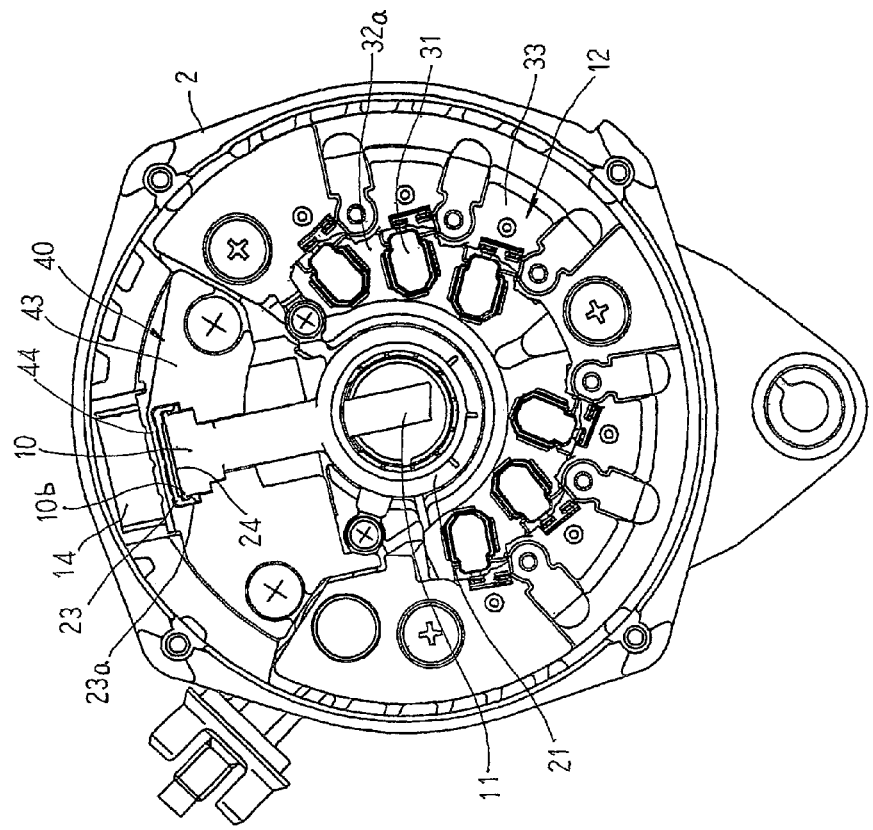
FIG. 11A is a front elevation that shows a mounted state of a rectifier and a brush holder assembly in the automotive alternator according to the preferred embodiment of the present invention.
Figure 11B:
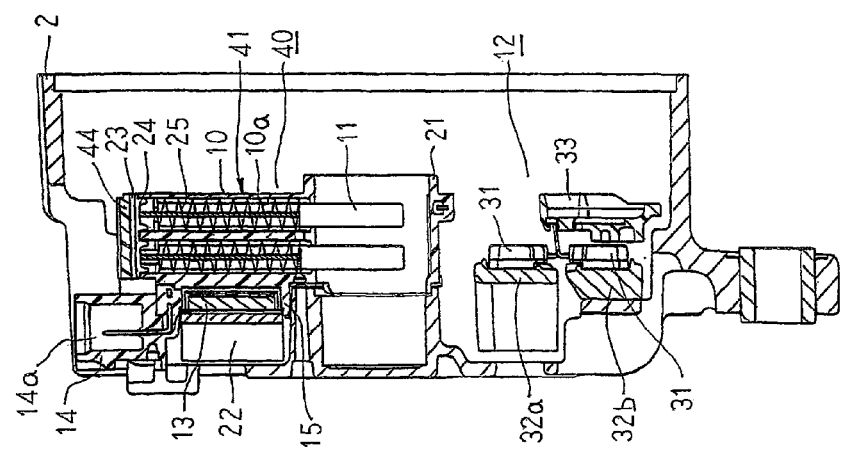
FIG. 11B is a cross section that shows a mounted state of a rectifier and a brush holder assembly in the automotive alternator according to the preferred embodiment of the present invention.
Figure 12A:
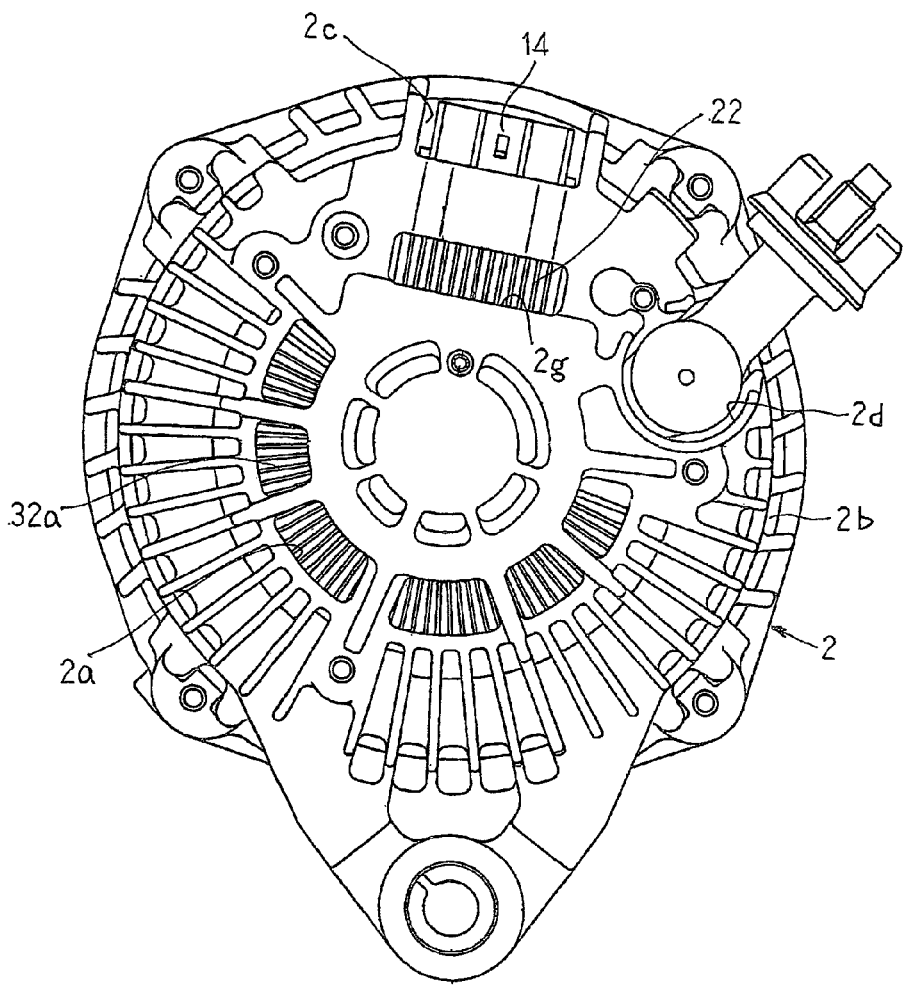
FIG. 12A is a rear-end end elevation that shows the automotive alternator according to the preferred embodiment of the present invention.
Figure 12B:
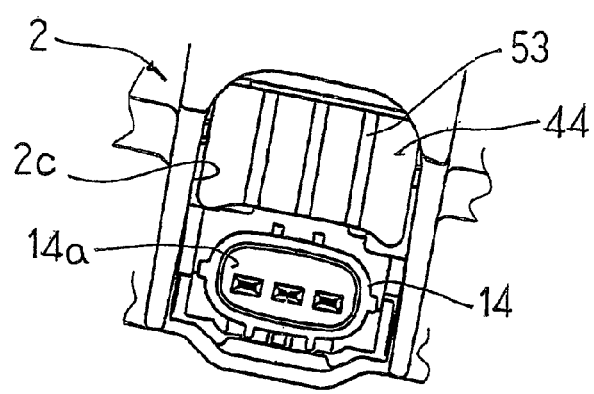
FIG. 12B is a top plan that shows a vicinity of a lead-through opening in the automotive alternator according to the preferred embodiment of the present invention.
Figure 13:
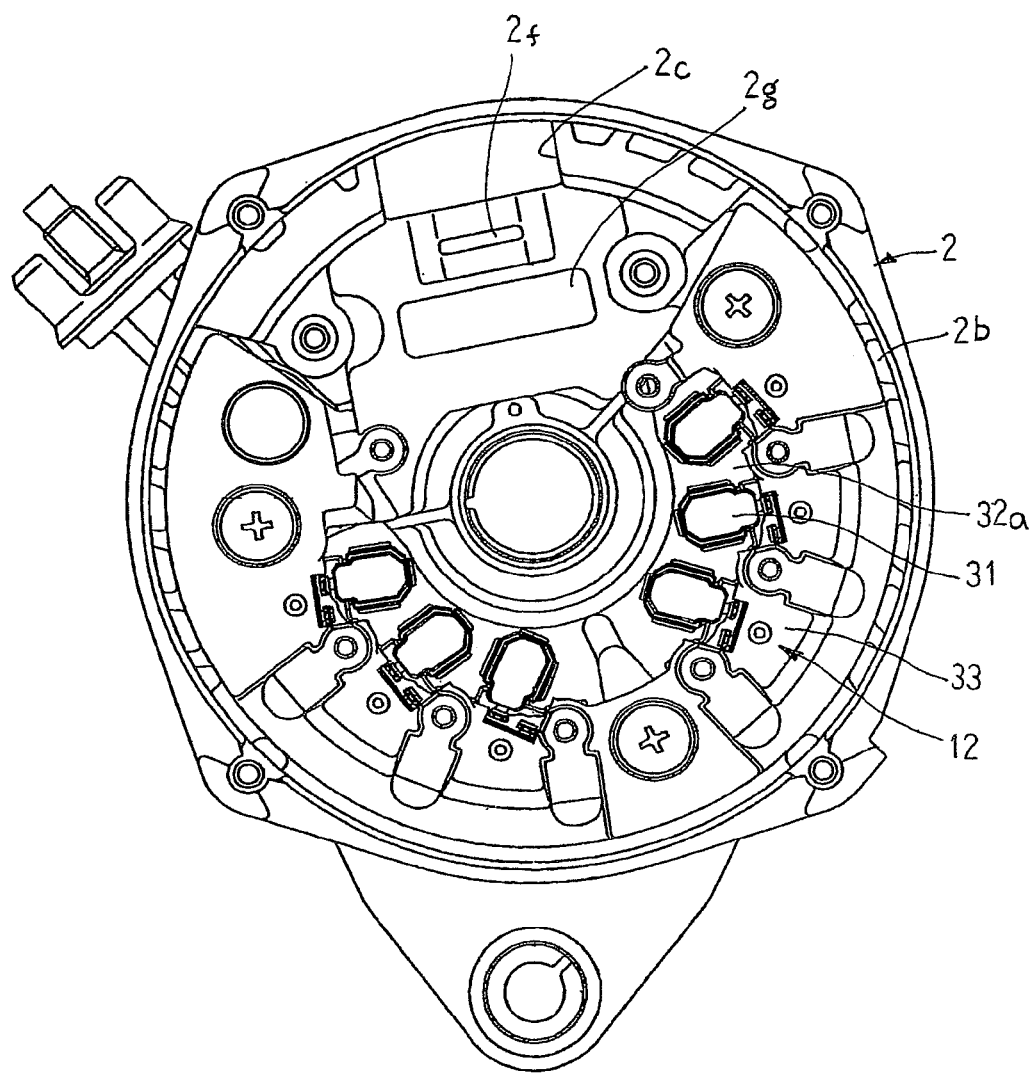
FIG. 13 is a front elevation that shows a mounted state of a rectifier in the automotive alternator according to the preferred embodiment of the present invention.

FIGS. 11A and 11B are a front elevation and a cross section, respectively, that show a mounted state of a rectifier and a brush holder assembly in the automotive alternator according to the preferred embodiment of the present invention, FIG. 12A is a rear-end end elevation that shows the automotive alternator according to the preferred embodiment of the present invention, FIG. 12B is a top plan that shows a vicinity of a lead-through opening in the automotive alternator according to the preferred embodiment of the present invention, and FIG. 13 is a front elevation that shows a mounted state of a rectifier in the automotive alternator according to the preferred embodiment of the present invention.

The rectifier 12 is assembled by disposing concentrically in a common plane approximately C-shaped heatsinks 32a and 32b onto which have been mounted a plurality of diodes 31, and stacking an approximately C-shaped circuit board 33 on a heatsink 32b. The diodes 31 that are mounted onto the heatsinks 32a and 32b are connected so as to constitute a rectifier circuit by means of the circuit board 33.

As shown in FIG. 13, the rectifier 12 is disposed around a central axis of the rear bracket 2 in an arc shape, and is fastened to an inner wall surface of the rear bracket 2. A positioning portion 2f for positioning the connector portion 14 is disposed on an inner wall surface of the rear bracket 2 between end surfaces of the approximately C-shaped rectifier 12, and large air intake apertures 2g are disposed opposite the heatsink 22 of the regulator circuit 13.

As shown in FIGS. 11A and 11B, the brush holder assembly 40 is disposed between the end surfaces of the approximately C-shaped rectifier 12 by aligning the central axis of the slinger portion 21 with the central axis of the rear bracket 2, and is fastened to an inner wall surface of the rear bracket 2. The front surface of the straightening vane portion 43 is thereby positioned in a common plane with a surface of the rectifier 12 that faces the blades of a cooling fan 7b so as to constitute a flat annular blade-facing surface.

As shown in FIG. 12A, a large number of air intake apertures 2a and air discharge apertures 2b are disposed on the rear bracket 2. A lead-through opening 2c for connecting an external connector to the connector portion 14 and a B terminal lead-through opening 2d are disposed through respective portions of the rear bracket. As shown in FIG. 12B, a large portion of the lead-through opening 2c is closed over by the cover portion 44 of the plate 42 except for the lead-through portion of the connector portion 14.

Thus, according to the present invention, because the brush holder portion 10, the regulator circuit housing portion 15, and the connector portion 14 are formed such that their respective center lines are positioned in a common plane that includes the central axis of the rotating shaft 4, exclusive circumferential space for the brush holder assembly 40 can be reduced. Thus, exclusive circumferential space for the rectifier 12 that is disposed in a common plane with the central axis of the brush holder assembly 40 that is perpendicular to the rotating shaft 4 can be increased, enabling the heat radiating area of the heatsinks 32a and 32b to be enlarged, thereby enabling heat that is generated by the diodes 31 to be radiated effectively.

Because the lead-through opening 2c that leads the connector portion 14 through is mostly closed by the connector portion 14 and the cover portion 44, entry of water, dust, etc., into the rear bracket 2 from outside can be reduced. Here, because the resin injection aperture 15a of the regulator circuit housing portion 15 is closed by the cover portion 44 of the plate 42, entry of water, dust, etc., into the regulator circuit housing portion 15 is suppressed.

Because the cover portion 44 is disposed so as to extend from the radially upper end of the straightening vane portion 43 to a vicinity of the connector portion 14, it functions together with the connector portion 14 to enable the lead-through opening 2c to be generally closed.

Because the straightening vane portion 43 functions together with the rectifier 12 and the brush holder portion 10 to constitute a flat annular blade-facing surface that faces the blades of a cooling fan 7b, the occurrence of magnetic noise that results from rotation of the cooling fan 7b is suppressed.

Because the plate 42 is mounted onto the base 41 by fitting the interfitting portion 51 that is disposed on the plate 42 onto a radially upper end portion of the brush holder portion 10, mounting of the plate 42 is simplified.

Because the lugs 52 are disposed so as to project from the inner wall surface of the cover portion 44, the lugs 52 press on the resin cap 23 when the brush holder portion 10 is fitted into the interfitting portion 51 of the plate 42. Thus, the fitting force from the plate 42 acts on the resin cap 23 by means of the lugs 52, preventing the resin cap 23 from dislodging.

Because the noise-preventing capacitor 48 is embedded integrally into the straightening vane portion 43 of the plate 42, members for mounting the capacitor 48 can be omitted, enabling the number of parts to be reduced, and only the plate 42 needs to be replaced if the capacitor 48 fails, also improving maintainability.

Because the lugs 52 and the recessed grooves 53 that are disposed on the inner circumferential surface and the outer circumferential surface of the cover portion 44 constitute interfitting engaging portions that can be stacked, and the groove 54 and the pin 55 that are disposed on two surfaces of the straightening vane portion 43 similarly constitute an interfitting engaging portion that can be stacked, a plurality of plates 42 can be stacked compactly, facilitating transportation of the plates 42 and also reducing transport volume.

Figure 14:
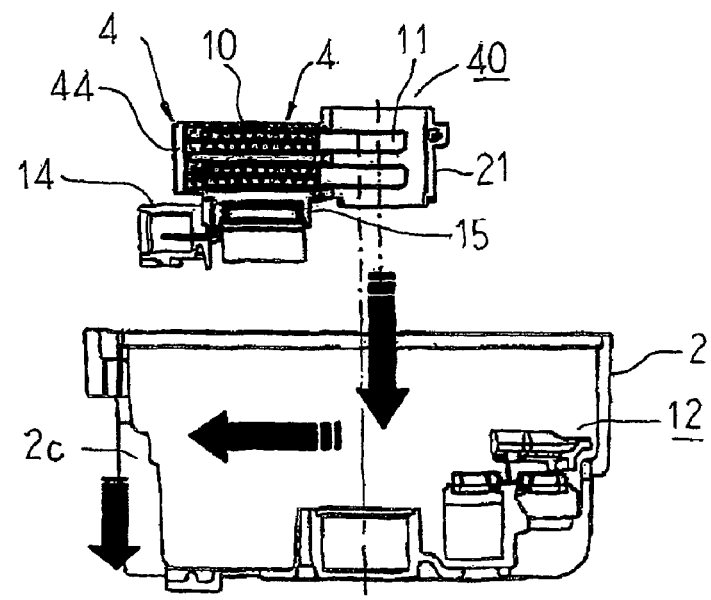
FIG. 14 is a diagram that explains a method for mounting the brush holder assembly according to the automotive alternator according to the preferred embodiment of the present invention.
Figure 14:
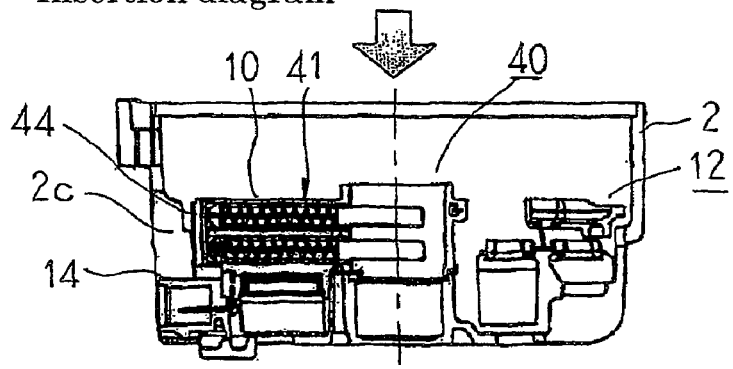
Figure 14:
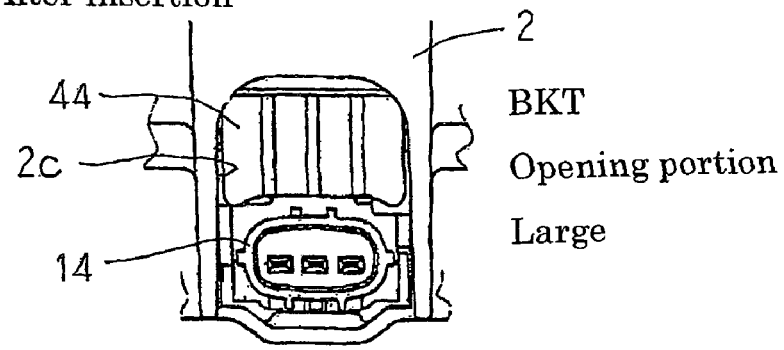

Because the connector portion 14 projects radially outward, the brush holder assembly 40 can be mounted inside the rear bracket 2 easily. In other words, as shown in FIG. 14, by inserting the brush holder assembly 40 axially into the rear bracket 2, and then offsetting it radially outward, and pushing it in axially while maintaining that state, the connector portion 14 can be assembled smoothly without touching the rear bracket 2.

Moreover, in the above embodiment, the connector portion 14 projects radially through the rear bracket 2 such that the opening portion 14a faces radially outward, but a connector portion may also be prepared so as to project axially through the rear bracket such that the opening portion faces axially. In that case, radial dimensions of the brush holder assembly can be reduced.

What is claimed is:

1. An automotive alternator comprising:
    a rotor that is fixed to a rotating shaft;
    a front bracket and a rear bracket that rotatably support said rotating shaft and that envelop said rotor;
    a stator that is held by said front bracket and said rear bracket and that surrounds said rotor;
    a cooling fan that is fixed to an axial end surface of said rotor;
    a regulator circuit that adjusts magnitude of alternating-current voltage that is generated by said stator;
    a base into which are molded integrally:
        a brush holder portion that is disposed so as to face said rotor such that an aperture direction of a brush insertion aperture is aligned in a radial direction, and that holds a brush inside said brush insertion aperture;
        a regulator circuit housing portion that is disposed such that a resin injection aperture faces radially outward at a rear bracket end of said brush holder portion, and that houses and holds said regulator circuit; and
        a connector portion that is disposed at said rear bracket end of said brush holder portion,
        said base being mounted inside said rear bracket;
    a cap that is mounted onto a radially outer end portion of said brush holder portion, and that closes said brush insertion aperture; and
    a resin plate that is mounted onto said brush holder portion, and that has a cover portion that closes said resin injection aperture,
    wherein:
    said brush holder portion, said regulator circuit housing portion, and said connector portion are formed so as to be positioned such that respective center lines thereof are in a common plane that includes a central axis of said rotating shaft; and
    a lead-through opening that is formed on said rear bracket so as to allow said connector portion to be led through is substantially closed by said connector portion and said cover portion,
    said automotive alternator further comprising a rectifier that is mounted inside said rear bracket so as to face said rotor, and
    a straightening vane portion being formed integrally on said plate so as to function together with said brush holder portion and said rectifier to constitute an annular flat surface that faces blades of said cooling fan.

2. An automotive alternator according to claim 1, wherein said connector portion is disposed so as to be adjacent to a radially outer side of said regulator circuit housing portion.

3. An automotive alternator according to claim 1, wherein said connector portion projects radially outward.

4. An automotive alternator according to claim 1, wherein a noise-preventing capacitor is embedded in said plate.

5. An automotive alternator according to claim 1, wherein said plate is mounted removably onto said brush holder portion.

6. An automotive alternator comprising:
    a rotor that is fixed to a rotating shaft;
    a front bracket and a rear bracket that rotatably support said rotating shaft and that envelop said rotor;
    a stator that is held by said front bracket and said rear bracket and that surrounds said rotor;
    a cooling fan that is fixed to an axial end surface of said rotor;
    a regulator circuit that adjusts magnitude of alternating-current voltage that is generated by said stator;
    a base into which are molded integrally:
        a brush holder portion that is disposed so as to face said rotor such that an aperture direction of a brush insertion aperture is aligned in a radial direction, and that holds a brush inside said brush insertion aperture;
        a regulator circuit housing portion that is disposed such that a resin injection aperture faces radially outward at a rear bracket end of said brush holder portion, and that houses and holds said regulator circuit; and
        a connector portion that is disposed at said rear bracket end of said brush holder portion,
        said base being mounted inside said rear bracket;
    a cap that is mounted onto a radially outer end portion of said brush holder portion, and that closes said brush insertion aperture; and a resin plate that is mounted onto said brush holder portion, and that has a cover portion that closes said resin injection aperture, wherein:

said brush holder portion, said regulator circuit housing portion, and said connector portion are formed so as to be positioned such that respective center lines thereof are in a common plane that includes a central axis of said rotating shaft;

a lead-through opening that is formed on said rear bracket so as to allow said connector portion to be led through is substantially closed by said connector portion and said cover portion, and said cap is configured so as to have a two-layer construction that includes a rubber cap portion that is fitted into a radially upper opening of said brush insertion aperture and a resin cap portion that holds said rubber cap portion.

7. An automotive alternator according to claim 1, wherein said cover portion is disposed so as to extend axially from a radially upper end of said straightening vane portion to a vicinity of said connector portion.

8. An automotive alternator comprising:

a rotor that is fixed to a rotating shaft;

a front bracket and a rear bracket that rotatably support said rotating shaft and that envelop said rotor;

a stator that is held by said front bracket and said rear bracket and that surrounds said rotor;

a cooling fan that is fixed to an axial end surface of said rotor;

a regulator circuit that adjusts magnitude of alternating-current voltage that is generated by said stator;

a base into which are molded integrally:

a brush holder portion that is disposed so as to face said rotor such that an aperture direction of a brush insertion aperture is aligned in a radial direction, and that holds a brush inside said brush insertion aperture;

a regulator circuit housing portion that is disposed such that a resin injection aperture faces radially outward at a rear bracket end of said brush holder portion, and that houses and holds said regulator circuit; and a connector portion that is disposed at said rear bracket end of said brush holder portion, said base being mounted inside said rear bracket;

a cap that is mounted onto a radially outer end portion of said brush holder portion, and that closes said brush insertion aperture; and a resin plate that is mounted onto said brush holder portion, and that has a cover portion that closes said resin injection aperture, wherein:

said brush holder portion, said regulator circuit housing portion, and said connector portion are formed so as to be positioned such that respective center lines thereof are in a common plane that includes a central axis of said rotating shaft;

a lead-through opening that is formed on said rear bracket so as to allow said connector portion to be led through is substantially closed by said connector portion and said cover portion, and a lug that presses said cap onto said brush holder portion is formed on said cover portion.

9. An automotive alternator comprising:

a rotor that is fixed to a rotating shaft;

a front bracket and a rear bracket that rotatably support said rotating shaft and that envelop said rotor;

a stator that is held by said front bracket and said rear bracket and that surrounds said rotor;

a cooling fan that is fixed to an axial end surface of said rotor;

a regulator circuit that adjusts magnitude of alternating-current voltage that is generated by said stator;

a base into which are molded integrally:

a brush holder portion that is disposed so as to face said rotor such that an aperture direction of a brush insertion aperture is aligned in a radial direction, and that holds a brush inside said brush insertion aperture;

a regulator circuit housing portion that is disposed such that a resin injection aperture faces radially outward at a rear bracket end of said brush holder portion, and that houses and holds said regulator circuit; and a connector portion that is disposed at said rear bracket end of said brush holder portion, said base being mounted inside said rear bracket;

a cap that is mounted onto a radially outer end portion of said brush holder portion, and that closes said brush insertion aperture; and a resin plate that is mounted onto said brush holder portion, and that has a cover portion that closes said resin injection aperture, wherein:

said brush holder portion, said regulator circuit housing portion, and said connector portion are formed so as to be positioned such that respective center lines thereof are in a common plane that includes a central axis of said rotating shaft;

a lead-through opening that is formed on said rear bracket so as to allow said connector portion to be led through is substantially closed by said connector portion and said cover portion, and an interfitting engaging portion that can be stacked is disposed on said plate.

\* \* \* \* \*